Patented Oct. 9, 1945

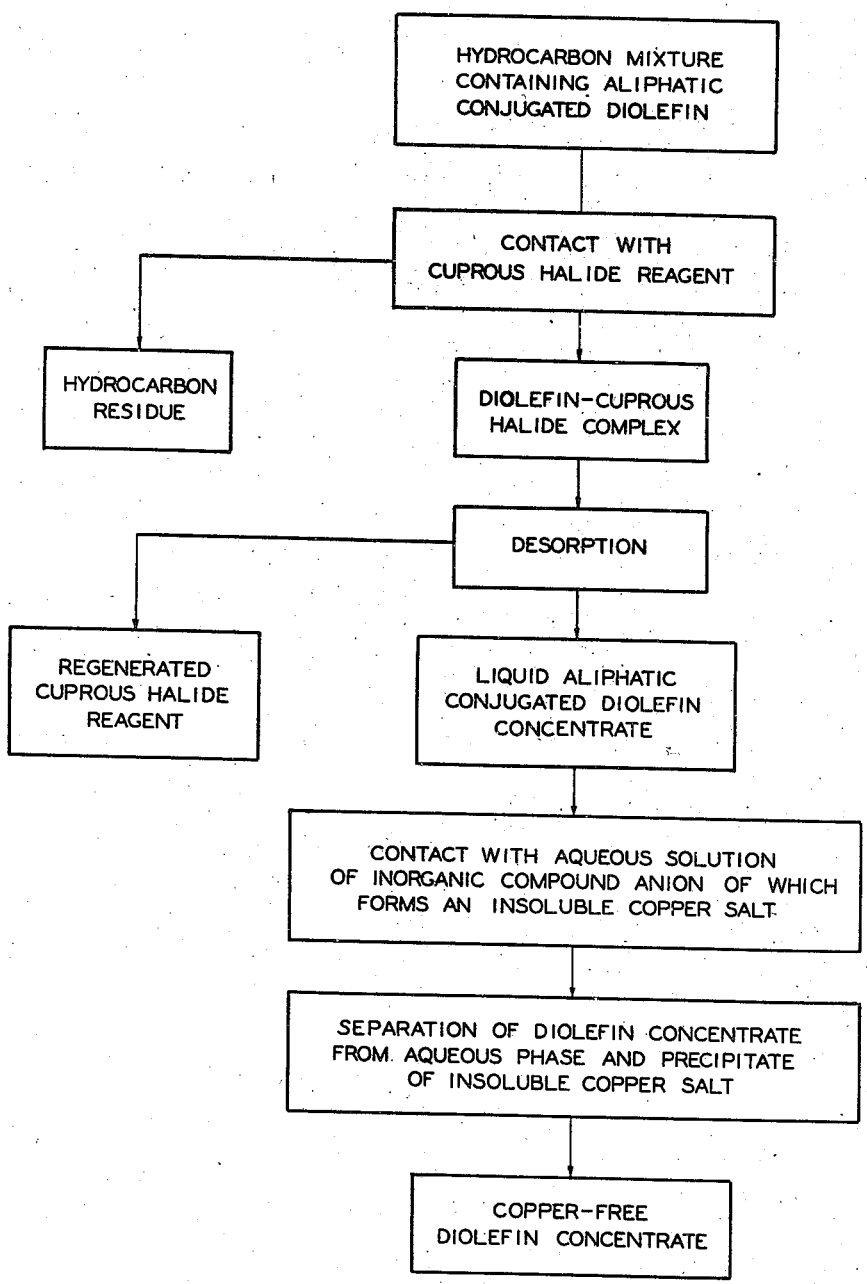

2,386,353

UNITED STATES PATENT OFFICE 2,386,353

PURIFICATION OF UNSATURATED HYDROCARBONS

Walter A. Schulze, Bartlesville, Okla., assignor to Phillips Petroleum Company, a corporation of Delaware Application April 5, 1943, Serial No. 481,913

9 Claims. (Cl. 260—681.5)

The invention relates to the purification of unsaturated hydrocarbons produced by the thermal and/or catalytic treatment of suitable hydrocarbon materials. More specifically, this invention relates to the purification of the mono-olefin and/or diolefin extracts and the corresponding residues from mixtures produced by the thermal or catalytic treatment of petroleum fractions or hydrocarbon stocks from any source.

In a still more specific sense this invention concerns the purification of said components of hydrocarbon mixtures subsequent to chemical absorption treatment for the segregation of diolefins and prior to further processing in which the impurities so removed would be detrimental.

This is a continuation-in-part of my co-pending application Serial No. 355,257, filed September 3, 1940, in which the purification of the unsaturated hydrocarbon mixtures of low diolefin content resulting from diolefin extraction processes is particularly claimed.

Various processes for the production of diolefins and particularly of butadiene have been proposed. These include the thermal cracking of petroleum fractions and higher molecular weight hydrocarbons of aliphatic or cyclic nature as well as the catalytic dehydrogenation of paraffins and/or olefins of the same number of carbon atoms. Such processes involve the production and segregation of hydrocarbon mixtures which may contain, in addition to the desired diolefins, paraffins, mono-olefins and other unsaturates of the same or a smaller number of carbon atoms and often of approximately the same boiling range.

The extraction and recovery of diolefins from mixtures of the type described has been attempted by methods such as solvent extraction, chemical separation and the like. Chemical separation processes have proposed the use of solutions of salts of certain heavy metals of groups 1 and 2 of the periodic system and particularly of solutions of cuprous halides. Such cuprous salt solutions function through the formation of addition compounds with unsaturated hydrocarbons according to the following proposed equations:

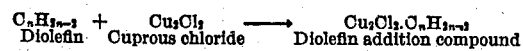
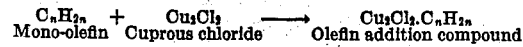

The diolefin addition compounds may be formed under conditions such that they are solids, while the olefin compounds may remain in solution in the extracting medium. The diolefin may then be recovered by separation of the solid product and by heating same to relatively moderate decomposition temperatures, or by other suitable desorption procedures.

The described methods of absorbing unsaturates by the use of cuprous halide solutions have been directed to treating gaseous hydrocarbon mixtures. More recently, it has been found possible to accomplish diolefin absorption and recovery by means of solid-type reagents comprising adsorbent carriers impregnated with suitable metal salts and/or solutions thereof which produce and retain the diolefin addition compound during contact with hydrocarbon fluids. In processes utilizing such solid reagents as described in copending application, Serial No. 354,086, filed August 24, 1940, the hydrocarbon may be in either liquid or vapor phase although liquid phase operation is preferred because of distinct advantages regarding operating flexibility and costs and the size of plant equipment.

In liquid phase absorption of unsaturates with cuprous halide solutions or with solid cuprous halide reagents, it has been found that the above-mentioned olefin and diolefin addition compounds have a definite solubility in the hydrocarbon phase, depending on the temperature of absorption and the composition of the hydrocarbon liquid. Apparently under the conditions favorable to the formation of solid diolefin addition compounds either or both of the addition products are retained in solution to some extent in the liquid residuum and carried away from the cuprous halide reagent. In certain cases $C_4$ hydrocarbon liquids after contact with a cuprous chloride reagent for the removal of butadiene have shown appreciable amounts of copper salt residue on evaporation.

Copper contamination as a result of the chemical separation process is extremely undesirable since it interferes with subsequent treatment of both the diolefin extract and the residuum. This is particularly true of those cyclic processes wherein the residuum from the diolefin extraction step is recycled for further conversion and production of diolefins. For example, the presence of copper in a butene-butane stock being recycled to a thermal or catalytic conversion operation to produce butadiene cannot be tolerated because of the catalytic effect of the copper on decomposition and polymerization reactions with consequent loss of valuable charging stock.

The undesirable consequences of copper contamination are also extended to those processes in which cuprous halide reagents are used to segregate monoolefins from paraffin-olefin hydrocarbon mixtures. Thus in processes for the separation of butenes from butene-butane mixtures copper compounds may be retained by the butane residuum from the separation process and exert harmful effects in further dehydrogenation or conversion of the paraffinic material.

The extent of contamination of a diolefin extract such as butadiene, isoprene, piperylene, etc., obtained subsequent to absorption by a cuprous halide reagent varies with the type of reagent and the method of operation. Thus, the extent of contamination by copper compounds is often less serious due to the sequence of desorbing operations which may evolve the diolefin in vapor phase from a solid addition product separated and/or retained by a solid type reagent. Proper control of desorption and stripping operations may be adequate in preventing copper carry over in such operations except in cases of mixed liquid-vapor phase desorption or of the use of a liquid desorption or stripping agent. In the case of desorption of diolefin from liquid solvents in the presence of other vapors or liquids, contamination by dissolved or entrained copper compounds may be encountered to a much greater extent.

The exact nature of the copper compounds retained by hydrocarbon liquids of the type described and ordinarily comprising mixtures of low boiling olefins and diolefins following contact with cuprous salt reagents under the above-mentioned conditions is not always known. It is assumed that both the olefin and diolefin addition compounds are present with the relative amounts depending on the extent to which separation has been effected in the purification process. The types of copper compounds are limited to those formed with olefin and diolefin hydrocarbons since no other metal salt-forming components are present in the hydrocarbon liquids undergoing treatment.

I have now discovered a method of purification of hydrocarbon liquids of the type described subsequent to treatment with cuprous halide reagents whereby the retained copper compounds are removed and the harmful after-effects of copper contamination are eliminated. My method of purification depends on the conversion of soluble unsaturated hydrocarbon-cuprous halide compounds to insoluble inorganic copper salts which are removed from the purified hydrocarbon liquid.

The accompanying drawing is a self-explanatory flow-diagram of the process of the present invention in a preferred embodiment.

I have found that when the diolefin concentrate resulting from concentration and purification procedures utilizing a cuprous halide reagent and containing dissolved copper compounds is intimately contacted with an aqueous solution of an inorganic compound the anion of which is capable of forming a water-insoluble and hydrocarbon-insoluble copper salt that the hydrocarbon soluble copper compounds are decomposed with the formation of the corresponding inorganic copper salt. The precipitate thus formed remains largely in the aqueous medium, and any dispersed solid may be removed from the hydrocarbon phase by gravity separation, water-washing, filtration or other suitable means. The purified hydrocarbon is then recovered satisfactorily free of copper.

The inorganic compounds which are useful in preparing satisfactory reagent solutions are those which furnish suitable anions in solution and which have no reactivity toward hydrocarbons. To secure satisfactory water solubility I may use the stable, non-volatile compounds of sodium, potassium and ammonium, although compounds of the alkaline earth metals and zinc and magnesium may be used for certain solutions if the water-solubility of the specific compounds is satisfactory.

The anions which are useful in forming water-insoluble copper salts are sulfide, hydroxide, carbonate, phosphate and silicate. These anions may be present alone or in certain combinations such as sulfide and hydroxide which I have found especially effective. All are supplied in water solutions by so-called strong inorganic bases or by the salts of strong bases and weak non-oxidizing acids which produce alkaline solutions by hydrolysis.

The reagent solutions may be prepared by dissolving a quantity of the inorganic compounds in water according to the concentration desired, or in some cases according to the solubility of the compounds in water. Usually solutions containing between 0.5 and 25 weight per cent of dissolved reagents are both effective and economical. Precautions are observed in preparing solutions to prevent the inclusion of ions that are mutually precipitatable in aqueous solution or which react together to form unstable or volatile products apt to contaminate the hydrocarbon liquid.

Intimate contact between the hydrocarbon liquid containing unsaturated hydrocarbon-cuprous halide addition compounds and the aqueous reagent solution may be obtained by any suitable means such as mixing in a centrifugal pump or the like, spraying one liquid in atomized form through the other, or by passing the liquids counter-current to each other in a packed column or the like. Any mixing device which affords sufficient contact to insure rapid reaction between the two immiscible phases is satisfactory.

The temperatures which are suitable for the operation of my process are ordinary atmospheric temperatures of 40° to 110° F. Temperature is not critical as long as the aqueous reagent solution is not frozen or dissolved salts are not precipitated, although higher temperatures are favorable to rapid action.

The pressures required by my process are low superatmospheric pressures in the range of 50 to 500 pounds gage. Sufficient pressure is furnished to maintain the hydrocarbon in liquid phase at treating temperatures.

The time of contact may be quite short with extreme intimacy of mixing. Thus, by mixing the hydrocarbon liquid and aqueous solution in 1:1 volume ratio into a temporary emulsion of very fine droplets, the reaction is quickly completed and on separation of the emulsion, the hydrocarbon is satisfactorily purified.

The hydrocarbon liquids which are treated according to the terms of my invention are the products of convertive reactions conducted under severe conditions for producing a high degree of unsaturation. Said liquids are of closely regulated composition and the control of composition, fractionation and conversion are designed to promote high yields and efficient utilization of raw materials. Under these conditions, impurities of the nature of sulfur, nitrogen and oxygen compounds are substantially absent from the raw materials, or are removed during or subsequent to the convertive reactions. In catalytic dehydrogenation and thermal cracking at temperatures above 1000° F. for example, sulfur compounds are converted to hydrogen sulfide and removed from the hydrocarbon vapors prior to the segregation of stocks for the extraction of diolefins. Oxygen compounds, if present, are similarly removed by the reduction in the hydrogen atmosphere of the convertive reactions. Organic nitrogen impurities are totally absent. Thus, the stocks to be purified ordinarily contain no compounds capable of combining with copper except the unsaturated hydrocarbons.

The following examples will serve to illustrate specific solution preparations and the use of these solutions for the purification of low-boiling hydrocarbon liquids.

Example I

A butene-butane stock was catalytically dehydrogenated and the effluene vapors were deethanized and condensed. The resulting $C_3$—$C_4$ liquid was cooled to a low temperature and contacted with an aqueous reagent solution containing cuprous chloride for the absorption of butadiene. The butadiene was removed by a desorbing and stripping operation to give a butadiene concentrate containing a small amount of dissolved copper compounds. The butadiene concentrate was passed to a mixing chamber for contact with a solution of 5 per cent by weight sodium sulfide and 5 per cent by weight sodium hydroxide.

The hydrocarbon effluent from the mixing chamber was settled free of aqueous solution and solids, and gave negative results on tests for dissolved copper.

Example II

A portion of a diolefin concentrate containing dissolved copper compound was washed with a solution of sodium phosphate containing 10 per cent by weight of the compound. The washed and settled hydrocarbon gave no trace of copper salt residue on evaporation.

Similar results were obtained using aqueous solutions containing 10 per cent by weight of sodium carbonate and 5 per cent by weight of sodium silicate respectively.

Example III

A $C_4$ hydrocarbon liquid consisting of butadiene, butenes and n-butane was contacted with a reagent solution of cuprous chloride in an immiscible solvent. The reagent containing solid butadiene-cuprous chloride addition product was removed, and the butene-butane liquid was separated for further dehydrogenation.

The solid butadiene-cuprous chloride addition product was decomposed by heating and the butadiene vapor was condensed and washed with 25 per cent by weight sodium hydroxide. The aqueous solution was separated and the purified butadiene gave negative results on tests for dissolved copper.

Example IV

A $C_5$ hydrocarbon liquid from a thermal cracking step consisting principally of isoprene and $C_5$ olefins was contacted with an aqueous solution of cuprous chloride under conditions favoring the formation of the isoprene-cuprous chloride complex. The isoprene-cuprous chloride addition product was removed along with the reagent solution and subjected to a heating and stripping operation to desorb the isoprene. The isoprene concentrate was then treated with an aqueous solution of sodium hydroxide and sodium sulfide containing 5 per cent by weight of each salt and after washing and settling was free of dissolved copper.

While the foregoing disclosure and examples have illustrated the invention and described several specific applications thereof other modifications will be obvious to those skilled in the art according to the principles outlined. Therefore, the scope of the invention is limited only by the claims.

I claim:

1. A process for the removal of dissolved unsaturated hydrocarbon-cuprous halide addition compound from liquid aliphatic conjugated diolefin concentrate containing the same and essentially free from sulfur, nitrogen and oxygen compounds which comprises intimately contacting said concentrate while maintaining same in liquid phase with an aqueous solution of an alkaline-reacting water-soluble inorganic compound the anion of which forms a water-insoluble and hydrocarbon-insoluble copper salt with said dissolved addition compound, thereby precipitating the copper contained in said addition compound as a water-insoluble and hydrocarbon-insoluble precipitate, and separating the resulting purified diolefin phase from said precipitate and the resulting aqueous solution.

2. A process for the removal of dissolved unsaturated hydrocarbon-cuprous halide addition compound from liquid butadiene concentrate containing the same and essentially free from sulfur, nitrogen and oxygen compounds which comprises intimately contacting said butadiene concentrate while maintaining same in liquid phase with an aqueous solution of an alkaline-reacting water-soluble inorganic compound the anion of which forms a water-insoluble and hydrocarbon-insoluble copper salt with said dissolved addition compound, thereby precipitating the copper contained in said addition compound as a water-insoluble and hydrocarbon-insoluble precipitate, and separating the resulting purified butadiene phase from said precipitate and the resulting aqueous solution.

3. The process of claim 1 wherein said inorganic compound is a water-soluble compound of an alkali metal.

4. The process of claim 1 wherein said inorganic compound is a water-soluble alkaline-reacting inorganic sulfide.

5. The process of claim 1 wherein said inorganic compound is sodium sulfide.

6. The process of claim 1 wherein said aqueous solution is a solution of an alkali metal sulfide and an alkali metal hydroxide.

7. The process of claim 1 wherein said aqueous solution is a solution of sodium sulfide and sodium hydroxide.

8. The process of recovering an aliphatic conjugated diolefin concentrate free from dissolved copper compound which comprises contacting a hydrocarbon mixture containing the diolefin and essentially free from sulfur, nitrogen and oxygen compounds with a cuprous halide reagent under conditions effecting selective absorption of the diolefin from said mixture by formation of a solid diolefin-cuprous halide addition compound, desorbing the diolefin in concentrated form from said addition compound and obtaining a liquid diolefin concentrate containing dissolved copper compounds in objectionable amount, said dissolved copper compounds being the addition compounds of unsaturated hydro-carbons with the cuprous halide reagent, intimately contacting said last-named concentrate while maintaining same in liquid phase with an aqueous solution of an alkaline-reacting water-soluble inorganic compound the anion of which forms a water-insoluble and hydrocarbon-insoluble copper salt with said dissolved addition compound, thereby precipitating the copper contained in said dissolved addition compound as water-insoluble and hydrocarbon-insoluble precipitate, and separating the resulting purified diolefin phase from said precipitate and the resulting aqueous solution.

9. The process of claim 8 wherein said diolefin is butadiene and said hydrocarbon mixture contains in addition to butadiene close-boiling aliphatic $C_4$ hydrocarbons.

WALTER A. SCHULZE.